(12) United States Patent
Stuckey

(10) Patent No.: US 8,545,763 B2
(45) Date of Patent: Oct. 1, 2013

(54) CATALYTIC CONVERTER SUBSTRATE STRUCTURE

(75) Inventor: Joshua Stuckey, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 425 days.

(21) Appl. No.: 12/696,228

(22) Filed: Jan. 29, 2010

(65) Prior Publication Data

US 2011/0189055 A1    Aug. 4, 2011

(51) Int. Cl.
*B01D 50/00* (2006.01)

(52) U.S. Cl.
USPC .......................................................... 422/180

(58) Field of Classification Search
USPC ................ 422/168, 177, 180; 55/385.3, 523
See application file for complete search history.

(56) References Cited

U.S. PATENT DOCUMENTS

| 4,233,351 A | 11/1980 | Okumura et al. |
| 4,448,828 A | 5/1984 | Mochida et al. |
| 4,810,554 A | 3/1989 | Hattori et al. |
| 6,544,310 B2 * | 4/2003 | Badeau et al. ............... 55/385.3 |
| 2005/0241266 A1 * | 11/2005 | Ichikawa ..................... 52/783.1 |

FOREIGN PATENT DOCUMENTS

| JP | 03188925 | 8/1991 |
| JP | 04150949 | 1/2010 |

* cited by examiner

*Primary Examiner* — Tom Duong
(74) *Attorney, Agent, or Firm* — Rankin Hill & Clark LLP

(57) ABSTRACT

A catalytic converter substrate structure includes an outer peripheral wall having a first end and a second end. A plurality of cells are defined by walls that are disposed within the outer peripheral wall and are interconnected to the outer peripheral wall. The plurality of cells extend axially along a length of the outer wall and have a varying density.

7 Claims, 6 Drawing Sheets

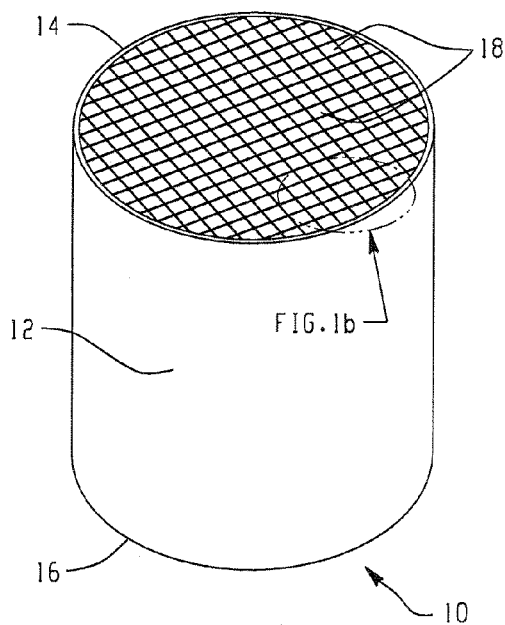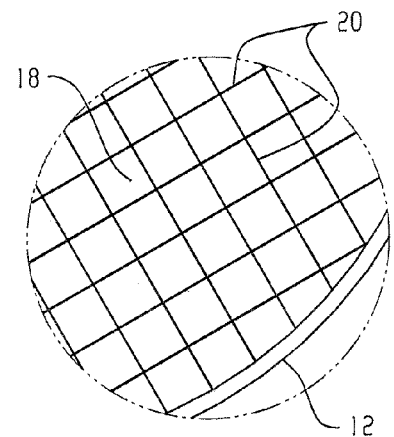
*Fig. 1a*
PRIOR ART
*Fig. 1b*
PRIOR ART
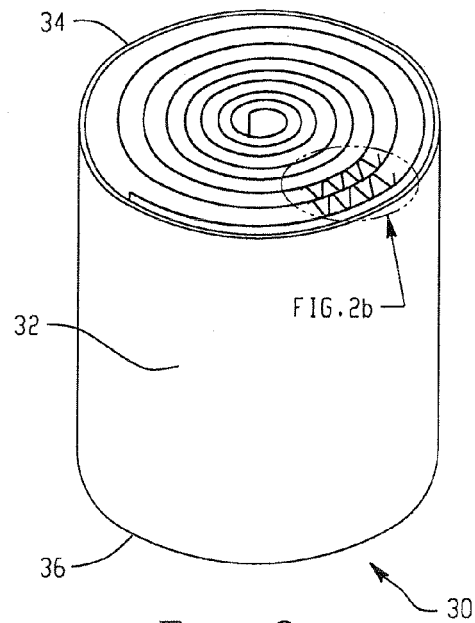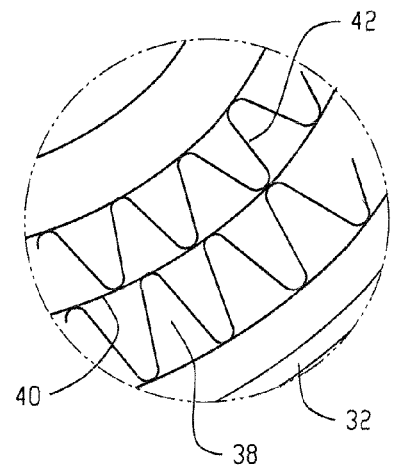
*Fig. 2a*
PRIOR ART
*Fig. 2b*
PRIOR ART

CATALYTIC CONVERTER SUBSTRATE STRUCTURE

BACKGROUND

The present disclosure generally relates to a catalytic converter substrate structure, such as the type that can be used as a catalyst carrier in an exhaust gas purification apparatus for an internal combustion engine.

Catalyst carriers for exhaust gas purification apparatuses have conventionally employed a honeycomb structural body, wherein partition walls or intersecting walls are arranged in a honeycomb fashion to form multiple cells. An exhaust gas purification function is achieved by providing an exhaust gas purifying catalyst on the surface of the partition walls of the honeycomb structural body. For example, a wash coat and precious metals can be received on the substrate structure. The substrate structure gives the shape and much of the flow properties to the catalyst.

In conventional catalytic converters, the substrate structure typically defines cells that are uniformly sized. A problem with this arrangement is that uniform flow, which is desired for full utilization of the catalyst, cannot always be achieved when catalytic converter cases having varying shapes are employed. For example, some catalytic converter cases include a sharp bend or elbow. Others include an expansion portion that distributes flow from a small diameter passage to a relatively large catalyst substrate body. When uniform cells are used in these types of converter configurations, uniform flow is difficult to achieve. This can lead to inefficient operation of the converter. In addition, the non-uniform deterioration of catalyst causes one portion of the catalyst to deteriorate more quickly than other portions leading to premature failure of the converter.

BRIEF DESCRIPTION

According to one aspect, a catalytic converter substrate structure includes an outer peripheral wall having a first end and a second end. A plurality of cells are defined by walls that are disposed within the outer peripheral wall and are interconnected to the outer peripheral wall. The plurality of cells extend along a length of the outer peripheral wall and have a varying density.

According to another aspect, a catalyst structure for a vehicle converter includes an outer wall having first and second ends and defining an axis. A plurality of cells are bounded by the outer wall. Each of the plurality of cells extends along a length of the outer wall and has a first open end and a second open end. The plurality of cells have cross-sectional areas that vary perpendicularly to the axis of the outer wall.

According to still another aspect, a catalytic converter includes a converter body and a plurality of axially extending cells disposed within the converter body. The plurality of cells have a progressively varying density to promote uniform flow through the converter body.

BRIEF DESCRIPTION OF THE DRAWINGS

FIGS. 1a and 1b are respectively a perspective view and a partial end view showing a known catalytic converter substrate structure having a uniform cell size and wall thickness.

FIGS. 2a and 2b are respectively a perspective view and a partial end view showing a known catalytic converter substrate structure having a spiral-shaped configuration with uniform cell size.

FIG. 3b is a cross-section of the catalytic converter taken along the line A-A of FIG. 3a.

FIG. 4b is a cross-section of the catalytic converter taken along the line B-B of FIG. 4a.

FIG. 5b is a schematic side perspective view of the catalytic converter substrate structure of FIG. 5a.

FIG. 6b is a schematic side perspective view of the catalytic converter substrate structure of FIG. 6a.

DETAILED DESCRIPTION

Figure 3A:
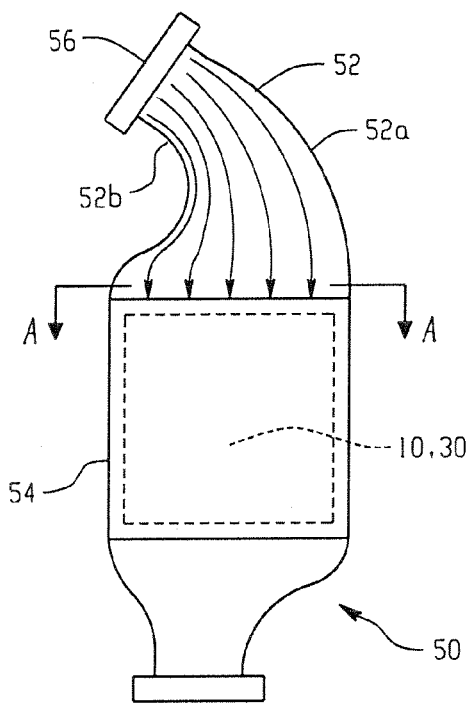
FIG. 3a is a schematic view of a catalytic converter of the close-coupled type having a converter substrate configured as shown in FIGS. 1a and 1b or FIGS. 2a and 2b.

FIGS. 1a and 1b illustrate a known catalytic converter substrate structure 10 having an outer peripheral wall 12 with a first end 14 and a second end 16. A plurality of cells 18 are defined by intersecting walls 20 that are disposed within the outer peripheral wall 12 and interconnected to the outer peripheral wall 12 The plurality of cells 18 extend axially between the first and second ends 14, 16 of the outer peripheral wall 12. As best shown in FIG. 1b, the plurality of cells 18 each have a rectangular cross-sectional shape and are of uniform size (i.e., the density of the cells is uniform or constant across the substrate structure 10).

With reference to FIGS. 2a and 2b, another known catalytic converter substrate structure 30 is shown. The substrate structure 30 includes an outer peripheral wall 32 having a first end 34 and a second end 36. A plurality of cells 38 (FIG. 2b) are defined by interconnected walls 40, 42 disposed within the outer peripheral wall 32. The walls 40, 42 are also typically interconnected to the outer peripheral wall 32. The wall 40 is wound into a spiral configuration and is maintained in the spiral configuration by the outer peripheral wall 32. The plurality of cells 38 extend axially along a length of the outer peripheral wall 32.

Unlike the substrate structure 10, the plurality of cells 38 of the substrate structure 30 are not rectangular in cross-section. Instead, the wall 42, which is interposed between adjacent layers of the wall 40 to define the cells 38, is formed in a corrugated configuration. The plurality of cells 38 formed by the walls 40, 42 (and the outer peripheral wall 32), although not rectangular in shape, are of a generally uniform shape (i.e., a density of the plurality of cells 38 is substantially uniform or constant across the substrate structure 30). Typically, however, there is some variation between the cells because of non-uniformity in the configuration of the corrugated wall 42. In particular, there can be variation in the size and shape of the cells located in a peripheral portion of the cells adjacent the outer peripheral wall 32.

Figure 3B:
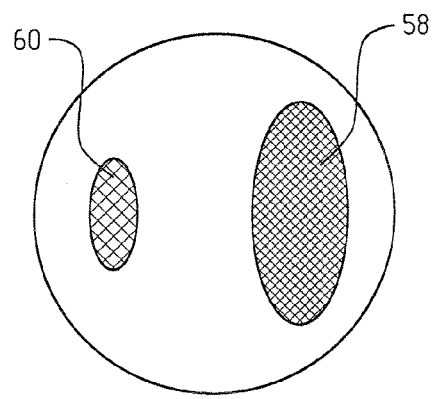

With reference to FIGS. 3a and 3b, a known catalytic converter 50 of the close-coupled type includes a case defining an interior in which a substrate structure (e.g., structure 10, 30 of FIGS. 1a-2b) is housed. In particular, the case of catalytic converter 50 includes a bent or elbow section 52 disposed between a main converter body 54 and an inlet 56 of the catalytic converter 50. Within the catalytic converter 50, particularly within the main converter body 54 of the case, one of the substrate structures 10 or 30 can be received. Flow through the catalytic converter 50 is not uniform when substrate structures, such as structures 10 or 30, having substantially uniform cell size are housed within the casing. This results primarily from the configuration of the elbow section 52.

In particular, as shown in FIG. 3b, flow through the catalytic converter tends to separate into a high flow or high velocity region 58 and a low flow or low velocity region 60. The high flow region 58 is located in an outer curved portion 52a of the elbow 52 and the low flow region 60 is located in an inner curved portion 52b of the elbow 52. Lack of uniform flow through the catalytic converter 50 can result in less than full utilization of the catalyst and catalyst material ordinarily disposed on the substrate structure 10 or 30. In addition, lack of uniformity in the usage of the catalyst material can shorten the overall life of the converter 50 because the increased usage in a high flow region can lead to more rapid failure of the converter.

Figure 4A:
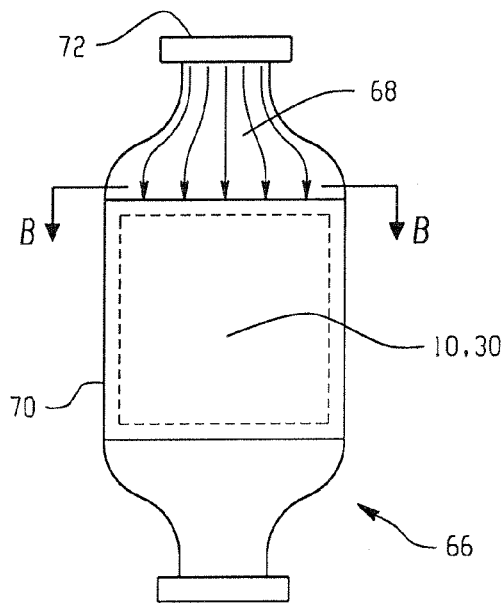
FIG. 4a is a schematic view of a catalytic converter of the under-floor type having a converter substrate configured as shown in FIGS. 1a and 1b or FIGS. 2a and 2b.
Figure 4B:
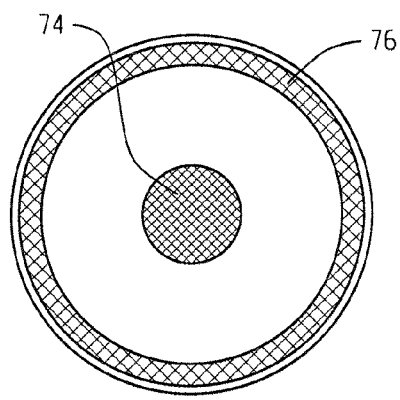

With reference to FIGS. 4a and 4b, there is shown another known catalytic converter 66 that could be used, for example, as an under-floor type catalytic converter. In the catalytic converter 66, an expansion portion 68 is disposed between a main converter body 70 and an inlet 72 of the catalytic converter 66. The expansion portion 68 expands flow radially from the inlet 72, which has a relatively small diameter, to the main converter body 70, which has a relatively large diameter. Within the main converter body 70, one of the known substrate structures 10, 30 can be received. As already described, either of the substrate structures 10, 30 has cells having a uniform size or density. When employed in the catalytic converter 66, flow through the substrate structure 10, 30 is not uniform due to the expansion section 68. Accordingly, as shown in FIG. 4b, flow through the catalytic converter 66 results in a high flow or high velocity region 74 positioned approximately centrally through the catalytic converter 66 and a low flow or low velocity flow region 76 disposed annularly adjacent an outer peripheral portion of the substrate structure 10, 30. Like the catalytic converter 50, the catalytic converter 70, due to its non-uniform flow applied to the substantially uniform cell configurations of substrate structures 10, 30, does not achieve uniform usage of the catalyst material and optimal life of the converter.

Figure 5A:
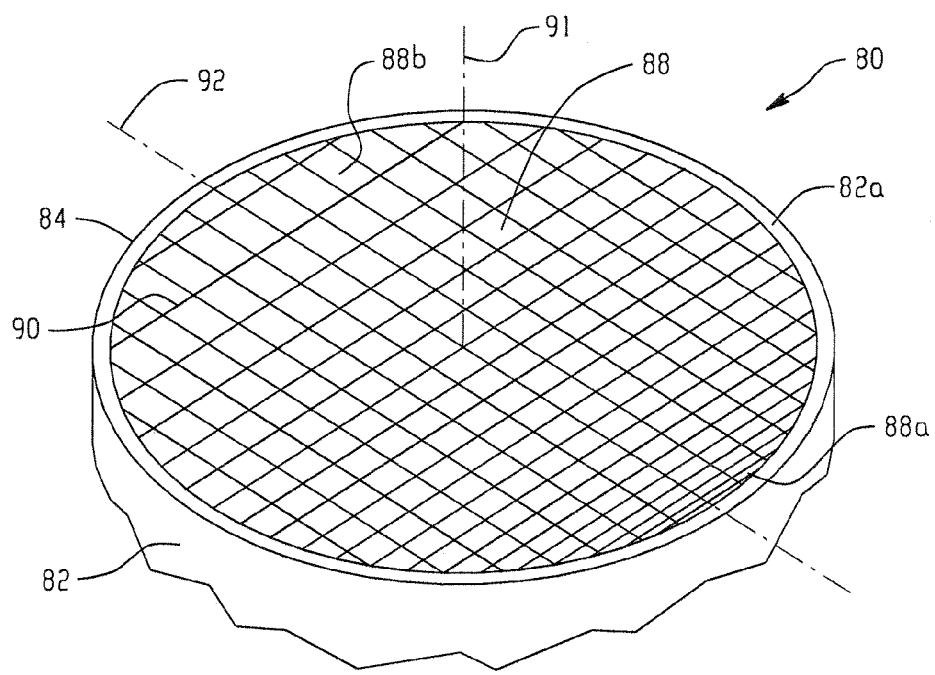
FIG. 5a is a schematic end perspective view of a portion of a catalytic converter substrate structure having cells with a varying density.
Figure 5B:
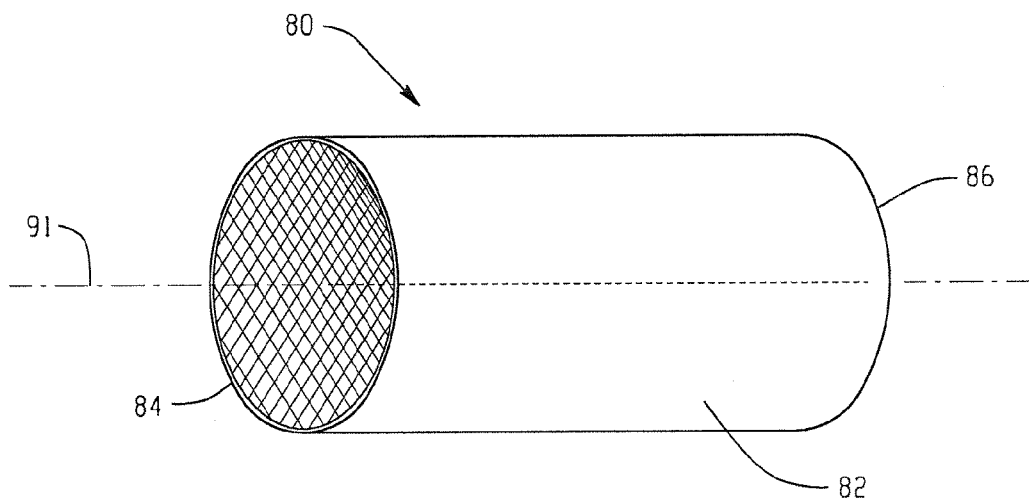

With reference to FIGS. 5a and 5b, a catalytic converter substrate structure 80 according to an exemplary embodiment of the invention is shown. The substrate structure 80 includes an outer peripheral wall 82 having a first end 84 and a second end 86. The substrate structure 80 further includes a plurality of cells 88 defined by intersecting walls 90 disposed within the outer peripheral wall 82. The walls 90 can be interconnected to the outer peripheral wall 82. The plurality of cells 88 extend axially along a length of the outer peripheral wall 82. In the depicted substrate structure 80, the cells 88 extend substantially along the entire length of the structure 80 between the first and second ends 84, 86 of the outer peripheral wall 82. It should be understood, however, that this is not a requirement of the invention (e.g., the cells could extend along a portion of the wall 82 such that a gap is defined at one or both ends of the wall). As will be described in more detail below, the plurality of cells 88 have a varying density.

The substrate structure 80, which can be referred to as a honeycomb structure for a vehicle, has its plurality of cells 88 bounded by the outer peripheral wall 82. The plurality of cells 88, in the depicted arrangement, terminate at the first and second ends 84, 86 of the outer peripheral wall 82 to form first and second end faces of the substrate structure 80 (only end face 82a shown). As such, the plurality of cells 88 each have a first open end at the first end face 82a and a second open end at the second end face (i.e., the end face at the end 86). The outer peripheral wall 82 defines an axis 91. The axis 91 could be a central axis of the wall. However, this is not a requirement. As shown, the cells have cross-sectional areas that vary in at least one direction perpendicular to the axis 91 of outer wall 82 to provide the varying density.

In the embodiment shown in FIGS. 5a and 5b, the outer peripheral wall 82 has a generally circular configuration and the density of the cells varies progressively along a line 92 forming a diameter of the outer peripheral wall 82. Also in the depicted configuration, each of the cells 88 has a quadrilateral shaped cross-section. In particular, the intersecting walls 90 define each of the plurality of cells 88 with a rectangular cross-sectional shape. It should be understood, however, that it is not a requirement of the invention that density vary along a line forming a diameter or that cells have a rectangular configuration or shape.

As shown in FIG. 5a, the plurality of cells 88 can be arranged or formed in rows and columns as defined by the intersecting walls 90. In the illustrated embodiment, the cells 88 within each of the rows have a uniform density. The variation in density is provided within the columns. In the depicted arrangement, the cells 88 provided in each of the columns have an increasing density in a first direction along the line 92, which defines a diameter of the outer peripheral wall 82, while the cells 88 provided in each of the rows have a uniform density. Therefore, smaller cells 88a of the plurality of cells are grouped along one side of the substrate structure 80 and larger cells 88b of the plurality of cells 88 are grouped along a diametrically opposed side of the substrate structure 80. In another embodiment, the cells 88 provided in the columns progressively increase in size in a first direction along a line perpendicular to the axis 91 of the substrate structure 80, thereby creating smaller cells 88a grouped along a side of the substrate structure 80 and larger cells 88b grouped along a diametrically opposed side of the substrate structure 80. It is appreciated that the substrate structure 80 could be substituted for one of the substrate structures 10 or 30 in the catalytic converter 50 of FIGS. 3a and 3b for purposes of providing uniform flow (or at least more uniform flow) through the catalytic converter 50. Such uniform flow could allow for full (or at least better) utilization of the catalyst and catalyst material disposed on the substrate structure 80, thereby improving efficiency in the operation of the converter. In addition, by providing uniform deterioration of the catalyst material, premature deterioration of one portion of the catalyst material is avoided, thereby extending the life of the converter.

Figure 6A:
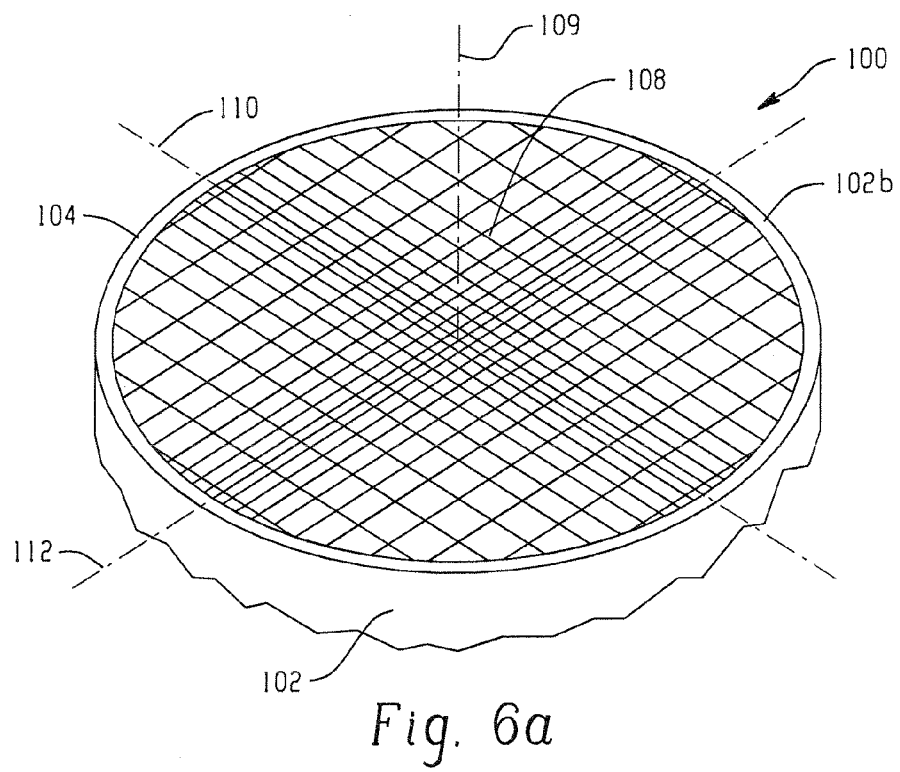
FIG. 6a is a schematic end perspective view of a portion of another catalytic converter substrate structure having cells with a varying density.
Figure 6B:
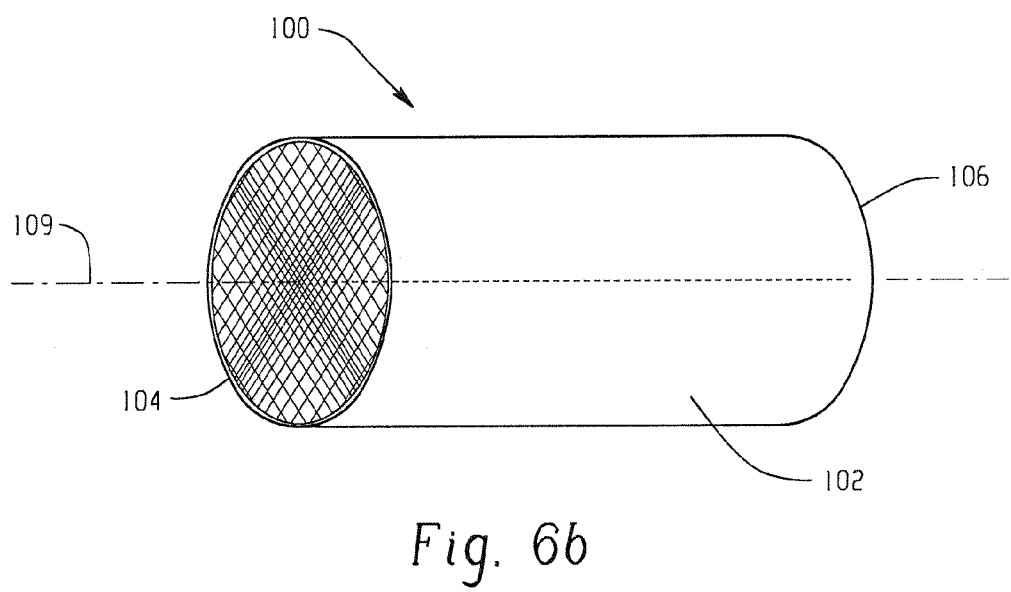

With reference to FIGS. 6a and 6b, another catalytic converter substrate structure 100 is shown including an outer peripheral wall 102 having a first end 104 and a second end 106. The substrate structure 100 further includes a plurality of cells 108 disposed within the outer peripheral wall 102 and interconnected to the outer peripheral wall 102. The plurality of cells 108 extend axially along a length of the outer peripheral wall 102. The plurality of cells 108 each have a first open end and an opposite second open end. The substrate structure 100 could also be substituted for one of the substrate structures 10 or 30 in the catalytic converter 50 of FIGS. 3a and 3b for purposes of providing uniform flow (or at least more uniform flow) through the catalytic converter 50. This has the same advantages as discussed above, including full or better utilization of the catalyst and the catalyst material, which improvise efficiency in operation of the converter, and preventing or lessening premature deterioration to extend the life of the converter.

The plurality of cells 108 have a density that varies perpendicularly to an axis 109 of the outer wall 102. The density of the cells 108 depicted in FIG. 6a varies in multiple directions. In particular, the density varies along first and second lines 110, 112 each defining a diameter of the outer wall. As shown, the first and second lines 110, 112 can be substantially orthogonal. However, it should be understood that the first and second lines need not be orthogonal lines and that the density need not vary along a line defining a diameter.

In the embodiment depicted in FIGS. 6a and 6b, each of the plurality of cells 108 has a quadrilateral shaped cross-section, particularly a rectangular cross-sectional shape in the illustrated embodiment, though this is not required. As shown, the plurality of cells 108 can be arranged or formed in rows and columns. In addition, the plurality of cells 108 can increase in size in opposite directions along the first line 110 as the distance from the second line 112 increases. Similarly, the plurality of cells 108 can also increase in size in opposite directions along the second line 112 as the distance from the first line increases. Accordingly, by this arrangement, the plurality of cells 108 progressively increases in size in both directions along the first line 110 and in both directions along the second line 112. As shown in FIG. 6a, the plurality of cells 108 includes a higher density of cells grouped closer to the respective lines 110, 112 and includes a lower density of cells 108 as the plurality of cells 108 move away from the lines 110, 112. This specifically can have the effect of allowing flow through the catalytic converter (i.e., the one in which the substrate structure 100 is employed) to be more uniform.

Figure 7:
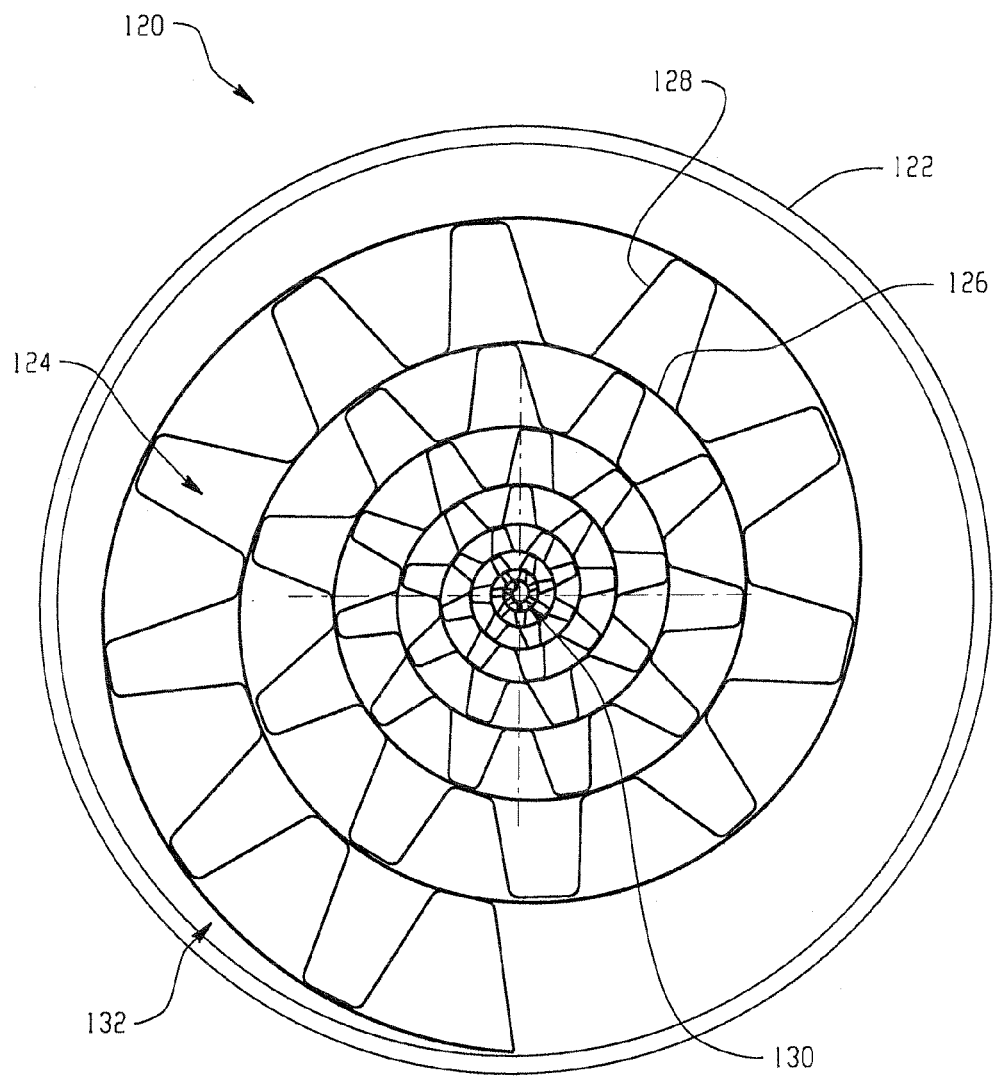
FIG. 7 is a schematic end view of a catalytic converter substrate structure having a spiral-shaped configuration with cells having a varying density.

With reference to FIG. 7, still another catalytic converter substrate structure 120 is shown including an outer peripheral wall 122 having a first end (the end shown) and a second end (not shown). A plurality of cells 124 are defined by walls 126, 128 that are disposed within the outer peripheral wall 122 and interconnected to the outer peripheral wall 122. The plurality of cells 124 extend axially along a length of the outer peripheral wall 122 and have a varying density. In particular, the plurality of cells 124 have a density and a cross-sectional area that vary perpendicularly to an axis of the outer wall 122.

In particular, in the substrate structure 120 of FIG. 7, the walls include a spiraling wall 126 and a corrugated wall 128 disposed between adjacent layers of the spiraling wall 126. As shown, the spiraling wall 126 has a tighter winding toward a center 130 thereof and is thus less tightly wound adjacent the outer peripheral wall 122 as indicated at 132. As shown, the outer peripheral wall 122 is round and the plurality of cells 108 are at least partially defined by the spiral-shaped wall 126 disposed within an interior of the outer peripheral wall 122. By this arrangement, cells of the plurality of cells 124 adjacent the center 130 have a higher density and a smaller cross-sectional area than cells of the plurality of cells 124 adjacent the outer peripheral wall 122 at 132. The substrate structure 120 can advantageously be used in a catalytic converter arrangement such as that depicted in FIGS. 4a and 4b. In particular, the higher density of cells 124 provided centrally relative to those provided adjacent the outer peripheral wall 122 will have the effect of allowing flow through the catalytic converter 66 to be more uniform.

Figure 8:
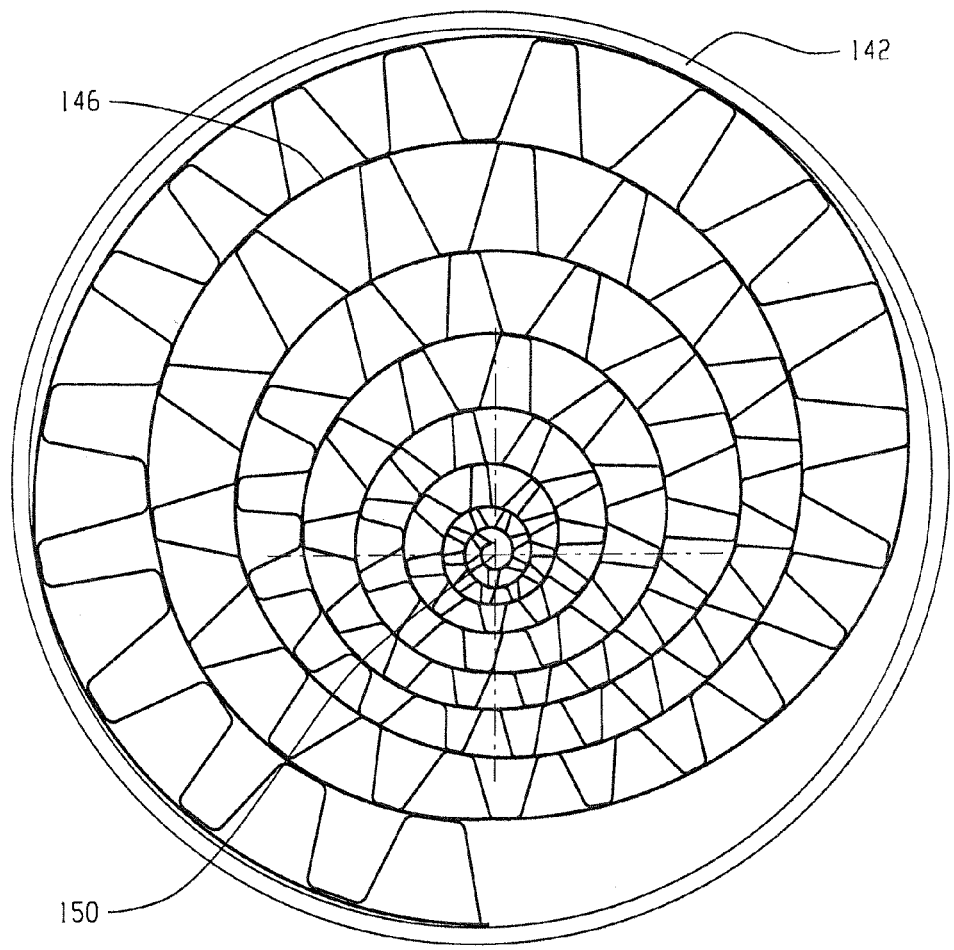
FIG. 8 is another schematic end view of a catalytic converter substrate structure having a spiral-shaped configuration with cells having a varying density wherein the spiral-shape is eccentric relative to an outer peripheral wall of the structure.

FIG. 8 depicts another substrate structure 140 that, except as noted herein, can be the same as the substrate structure 120. In the structure 140, outer peripheral wall 142 is round and plurality of cells 144 are at least partially defined by a spiral-shaped wall 146 disposed within an interior of the outer peripheral wall 142 and also at least partially defined by corrugated wall 148. Unlike the substrate structure 120 of FIG. 7, the spiraling wall 146 of the substrate structure 140 is eccentric relative to the outer peripheral wall 142. That is, a center 150 of the spiral shaped wall 146 is generally offset relative to a center of the outer peripheral wall 142. As shown, the spiraling wall 146 has a tighter winding toward the center 150 and such tighter winding progressively narrows toward the center 150. The offset could be created by controlling tensioning of the winding (e.g., using cams). Alternatively, the offset could be created with uniform tensioning using control over the crimping of the corrugated layer (e.g., by varying the shape of the corrugations). The substrate structure 140 could advantageously be employed in the catalytic converter 50 of FIGS. 3a and 3b in that it could more uniformly provide flow received through elbow portion 52a. In another embodiment, the outer peripheral wall 142 has a first end and a second end that define a longitudinal axis. A plurality of walls (i.e., the spiral shaped wall 146 and the corrugated wall 148) are disposed within an interior of the outer peripheral wall 142. The plurality of walls include at least one spiraling wall (i.e., the spiral shaped wall 146) that defines a center eccentric relative to a center of the longitudinal axis of the outer peripheral wall 142. A plurality of cells 144 defined by the plurality of walls are disposed within the outer peripheral wall 142 and interconnected to the spiraling wall. The plurality of cells 144 have a varying density.

Advantageously, any of the substrate structures of FIGS. 5-8 could be employed in a converter body, such as converter body 50 or 66, and the plurality of extending cells disposed therein, with the progressively varying density would promote uniform flow through the converter body. In some embodiments, the outer peripheral wall (e.g., wall 82, 102, 122, 142) could be integrally formed with the main converter body (e.g., body 54 or 70), though this is not required. The results of the substrate structures of FIGS. 5-8 are better utilization of any catalytic converter in which these substrates are disposed. In particular, uniform flow, or at least more uniform flow, can be achieved, which can allow converter cases or bodies to be formed of different shapes corresponding to different vehicle layouts.

It will be appreciated that various of the above-disclosed and other features and functions, or alternatives or varieties thereof, may be desirably combined into many other different systems or applications. For example, other cross sectional shapes (e.g., oval) for the substrate structure could be employed in additional to the circular embodiments described above. Also that various presently unforeseen or unanticipated alternatives, modifications, variations or improvements therein may be subsequently made by those skilled in the art which are also intended to be encompassed by the following claims.

The invention claimed is:

1. A catalytic converter substrate structure, comprising:
an outer peripheral wall having a first end and a second end that define a longitudinal axis; and
a plurality of cells defined by a plurality of intersecting walls that are disposed within said outer peripheral wall and interconnected to said outer peripheral wall, said plurality of cells are arranged in rows and columns defined by said plurality of walls and extend along a length of the outer peripheral wall, and wherein the cells provided in each of the columns have an increasing density in a first direction along a first line defining a diameter of the outer peripheral wall, thereby creating smaller cells grouped along a periphery of the converter body and larger cells grouped along a diametrically opposed periphery of the converter body.

2. The catalytic converter substrate structure of claim 1 wherein said plurality of cells have a rectangular cross-sectional shape.

3. A catalytic converter, comprising:
a converter body having a generally circular configuration; and
a plurality of axially extending cells disposed within said converter body, said converter body defining a longitudinal axis, said plurality of cells arranged in rows and columns, wherein said rows of said plurality of cells have a uniform size, and said columns of said plurality of cells progressively increase in size in a first direction along a line perpendicular to said axis, thereby creating smaller cells grouped along a periphery of the converter body and larger cells grouped along a diametrically opposed periphery of the converter body.

4. The catalytic converter of claim 3 wherein said converter said line defines a diameter of said converter body.

5. A catalytic converter substrate structure, comprising:
an outer peripheral wall having a first end and a second end that define a longitudinal axis;
a plurality of walls disposed within an interior of said outer peripheral wall, wherein said walls include at least one spiraling wall, wherein a center defined by said spiraling wall is eccentric relative to a center of the longitudinal axis of said outer peripheral wall; and
a plurality of cells defined by said plurality of walls disposed within said outer peripheral wall and interconnected to said spiraling wall, said plurality of cells having a varying density.

6. The catalytic converter substrate structure of claim 5, wherein the walls defining said plurality of cells includes first and second walls, the second wall including a plurality of corrugations.

7. The catalytic converter substrate structure of claim 5, wherein said spiral has a winding that is tighter toward a center of the spiral.

* * * * *